United States Patent [19]

Mrowca

[11] 3,859,319

[45] Jan. 7, 1975

[54] CARBOALKOXYLATION OF UNSATURATED COMPOUNDS WITH A PALLADIUM CATALYST CONTAINING BRIDGING PHOSPHIDO GROUPS

[75] Inventor: Joseph J. Mrowca, Wilmington, Del.

[73] Assignee: E. I. du Pont de Nemours and Company, Wilmington, Del.

[22] Filed: Sept. 29, 1972

[21] Appl. No.: 293,333

[52] U.S. Cl. .............. 260/410.6, 260/404, 260/410, 260/410.5, 260/410.6, 260/465 D, 260/465.4, 260/468 M, 260/469, 260/473 R, 260/476 R, 260/484 R, 260/484 A, 260/483 R, 260/485 R, 260/486 AC, 260/497 A, 260/410.9 R

[51] Int. Cl. ............................................ C07c 67/00

[58] Field of Search... 260/410.9 R, 497 B, 486 AC, 260/468 M, 429 R, 485 R

[56] References Cited

UNITED STATES PATENTS

| | | | |
|---|---|---|---|
| 3,437,676 | 4/1969 | Von Kutepow et al | 260/468 |
| 3,455,989 | 7/1969 | von Kutepow et al | 260/468 |
| 3,519,663 | 7/1970 | von Kutepow et al | 260/429 |
| 3,641,074 | 2/1972 | Fenton | 260/410.9 |
| 3,700,706 | 10/1972 | Butter | 260/410.9 R |

OTHER PUBLICATIONS

Hayter J. Am. Chem. Soc. Vol. 84 pp. 3,046–3,053 (1962).

Hayter et al., Inorganic Chemistry, Vol. 2 pp. 306–312 (1963).

*Primary Examiner*—Lewis Gotts
*Assistant Examiner*—Diana G. Rivers

[57] ABSTRACT

Disclosed herein is a process for making esters by the catalytic addition of alcohols and carbon monoxide across ethylenic or acetylenic bonds in a variety of organic compounds. The catalyst is an organophosphorus palladium halide containing bridging phosphido groups. A tin salt promoter may also be used with the catalyst.

20 Claims, No Drawings

CARBOALKOXYLATION OF UNSATURATED COMPOUNDS WITH A PALLADIUM CATALYST CONTAINING BRIDGING PHOSPHIDO GROUPS

BACKGROUND OF THE INVENTION

1. Field of the Invention

This invention relates to a method for making organic esters by the catalytic addition of alcohols and carbon monoxide across aliphatic olefinic or acetylenic unsaturation. The catalyst is a palladium compound having bridging phosphido groups therein.

2. Description of the Prior Art

In the past, carboalkoxylation reactions have been catalyzed by simple salts of platinum, palladium and other Group VIII metals [Jenner and Lindsey, U.S. Pat. No. 2,876,254 (1959); Kehoe and Schell, J. Org. Chem., 35, 2846 (1970)]. Certain palladium salts complexed with phosphines, phosphites, ammonia, amines, nitriles and unsaturated hydrocarbons, have been used to obtain carboalkoxylation products [Kutepow et al., U.S. Pat. No. 3,437,676 (1969)]. Complex palladium salts in conjunction with a tin salt promoter have also been employed [Belgian Pat. No. 762,538, Aug. 4, 1971]. In addition, surface active agents have been used with complex palladium catalysts [Fenton, U.S. Pat. No. 3,530,155 (Sept. 22, 1970)], and certain aromatic palladium chelate catalysts [Fenton, U.S. Pat. No. 3,662,607 (Nov. 23, 1971)] have been used in hydrocarboxylation of olefins.

SUMMARY OF THE INVENTION

The novel process for making carboxylic ester compounds comprises reacting an aliphatically unsaturated compound with carbon monoxide and an alcohol having 1 to 6 primary or secondary hydroxy groups therein. Unsaturated compounds include those with more than one ethylenic and/or acetylenic groups. It should be understood that the aliphatically unsaturated compound can itself be an alcohol and the source of the hydroxy groups.

The reaction is conducted in the presence of a catalytic amount of an organophosphorus palladium halide catalyst containing bridging phosphido groups. Said catalyst is of the formula

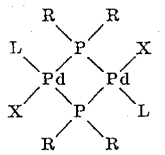

wherein

X is chlorine, bromine or iodine;

R is selected from lower alkyl, phenyl, and phenyl-substituted in the meta or para positions by lower alkyl, halogen or methoxy groups;

L is a trivalent organophosphorus ligand, $R'_3$ P or $R''_2PH$;

R', alike or different, is selected from lower alkyl, cycloalkyl or 3 to 8 carbon atoms, lower alkoxy, aryl of up to 12 carbon atoms, substituted with up to 3 halogen atoms or lower alkoxy groups, aryloxy groups of up to 12 carbon atoms, arylthio of up to 12 carbon atoms, aralkyl of up to 12 carbons, lower alkylthio, di(lower alkyl)amino, pyrrolidino, piperidino and vinyl groups, with the proviso that not more than one aryl group attached to phosphorus contains a substituent in a sterically hindered position; and R'', alike or different, is selected from lower alkyl, phenyl, and phenyl-substituted in the meta or para positions by lower alkyl, halogen or methoxy groups.

By "sterically hindered position" is meant in an adjacent position on the ring system or in the peri position in the naphthalene series.

Preferred organophosphorus ligands include $R'_3P$, where R' is lower alkyl, phenyl, or phenyl-substituted by lower alkyl, and $R'_2PH$, were R'' is phenyl or phenyl-substituted by lower alkyl. An especially preferred ligand is $(C_6H_5)_2PH$. Preferred R groups include lower alkyl and phenyl, with phenyl being especially preferred. Chlorine is the preferred X substituent.

The palladium catalyst is normally employed in a ratio of about 0.005:50 mmoles catalyst/mole of unsaturated reactant, preferably 0.2:15 mmoles catalyst/mole of reactant.

The unsaturated compounds are hydrocarbons or substituted hydrocarbons, containing at least one group of

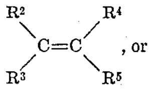 , or $R^6—C\equiv C—R^7$, wherein at least two of $R^2$, $R^3$, $R^4$ and $R^5$ are hydrogen, $R^2$ to $R^7$ are hydrogen or aliphatically saturated substituted or unsubstituted hydrocarbyl radicals, and any two of $R^2$, $R^3$, $R^4$ and $R^5$ can be joined to form a ring of 3 to 12 carbon atoms, and when more than one unsaturated group is present in the molecule, at least one of $R^2$ to $R^7$ will be a common, linking radical. Preferably the unsaturated compounds contain up to 30 carbon atoms.

The unsaturated compounds can have substituents selected from the group consisting of aryl, lower alkoxy, lower alkoxycarbonyl, carboxyl, lower acyloxy, cyano, carbamoyl, lower acyl, aroyl, halo and hydroxy substituents, with the proviso that halogen or hydroxyl, if present, be removed by at least two carbon atoms from the unsaturation.

The alcohols employed in the practice of this invention are $$R^9(OH)_m$$

wherein $R^9$ is a radical of up to 30 carbon atoms derived from a hydrocarbon having at least one aliphatic or alicyclic group and the hydroxy groups are joined to a saturated carbon atom having at least one hydrogen substituent, and removed from aliphatic unsaturation by at least 2 carbon atoms, and $m$ is 1 to 6, preferably 1 to 4.

$R^9$ can also be substituted with the substituents $R^2$ to $R^7$.

The carboalkoxylations of this invention are effected by heating the unsaturated compound, alcohol, palladium catalyst and, optionally, tin halide promoter in an atmosphere of carbon monoxide at temperatures from about 35° to 200+C., generally at 50° to 150°C., and preferably at 60° to 120°C. While carbon monoxide pressures of about 1 to 1,000 atmospheres or more can be used in practicing this invention, it is preferred to employ pressures in the range of 10 to 700 atmospheres. When a tin halide promoter is employed with the catalyst, they are used at molar ratios of between about 0.5:1 to 10:1, respectively.

"Aryl" is defined herein as a group derived from a hydrocarbon containing at least one 6-membered aromatic ring by removal of a hydrogen directly attached to a carbon atom of such ring. As thus defined, aryl groups include such species as phenyl groups substituted with lower alkyl groups.

The term "aralkyl" refers to a group derived from aromatic hydrocarbon having at least one alkyl substituent by removal of an aliphatic hydrogen atom. The term "lower alkyl" refers to a group derived from an aliphatic hydrocarbon having from 1 to 6 carbon atoms, by removal of a hydrogen atom. The term "cycloalkyl" refers to a group derived from a saturated alicyclic compound by removal of a hydrogen atom. A "common linking radical" is one which contains at least 1 carbon atom, contains no unsaturation, and can be substituted or unsubstituted.

DETAILS OF THE INVENTION

The aliphatically unsaturated compounds which are employed as reactants in the practice of this invention are organic compounds having one or more olefinic or acetylenic groups with the provisos that said groups have at least two hydrogen substituents, that they not be conjugated with other aliphatic unsaturation, that halogen or hydroxyl, if present, be removed by at least 2 carbon atoms from the unsaturation, and that there be no amine substitution.

When the unsaturated compound and the alcohol (hydroxy reactant) are the same, polyesters are produced. Preferred hydroxy-containing unsaturated compounds are those of the formula $$HO—CH_2—R^8—CH═CH_2$$

wherein $R^8$ is an aliphatically saturated biradical and preferably a polymethylene chain of 2 to 15 carbon atoms.

Preferred classes of olefins are: 1. 1-alkenes of the formula $CH_3(CH_2)_nCH═CH_2$, where *n* is 0 to 20, 2. diolefins of the formula $CH_2═CH(CH_2)_nCH═CH_2$, where *n* is 1 to 8,
3. esters of the formula lower alkyl—O—CO—$(CH_2)_n$ $CH═CH_2$, where *n* is less than 25. In especially preferred classes, *n* is no greater than 14.

Preferred olefins for the practice of this invention are:

| | |
|---|---|
| Ethylene | Nonadecene-1 |
| Propylene | Docosene-1 |
| Butene-1 | 1,5-Hexadiene |
| Pentene-1 | 1,6-Heptadiene |
| Hexene-1 | 1,7-Octadiene |
| Heptene-1 | 1,8-Nonadiene |
| Octene-1 | 1,9-Decadiene |
| Nonene-1 | 1,10-Undecadiene |
| Decene-1 | 1,11-Dodecadiene |
| Undecene-1 | 4-Vinylcyclohexene |
| Dodecene-1 | Methyl 10-undecenoate |
| Tridecene-1 | Ethyl 10-undecenoate |
| Tetradecene-1 | 10-Undecenoic acid |
| Pentadecene-1 | 10-Undecen-1-ol |
| Hexadecene-1 | 5-Hexen-2-one |
| Heptadecene-1 | 5-Hexenenitrile |
| Octadecene-1 | trans-1,4,9-Decatriene |

Other olefins that can be used in this invention include:

| | |
|---|---|
| Isobutylene | 3-Methylbutene-1 |
| 2-Methylbutene-1 | 2-Methylpentene-1 |
| 4-Methylpentene-1 | 2,3,3-Trimethylpentene-1 |
| 2,3-Dimethylbutene-1 | 2,4,4-Trimethylpentene-1 |
| 3,3-Dimethylbutene-1 | 3,4,4-Trimethylpentene-1 |
| 2-Methylhexene-1 | 2-Methyloctene-1 |
| 3-Methylhexene-1 | 7-Methyloctene-1 |
| 4-Methylhexene-1 | 2,6-Dimethylheptene-1 |
| 3-Ethylpentene-1 | 4,4-Dimethylheptene-1 |
| 2,3-Dimethylpentene-1 | 4-Methyl-4-ethylhexene-1 |
| 3,3-Dimethylpentene-1 | 4,4,5-Trimethylhexene-1 |
| 2,3,3-Trimethylbutene-1 | 3,7-Dimethyloctene-1 |
| 2-Methylheptene-1 | 2,5,6-Trimethylheptene-1 |
| 4-Methylheptene-1 | 2,3-Dimethyloctene-1 |
| 4-Ethylhexene-1 | 3-Butyloctene-1 |
| 2,3-Dimethylhexene-1 | 3-Propylnonene-1 |
| 2,5-Dimethylhexene-1 | 3,7,11-Trimethyldodecene-1 |
| 3,4-Dimethylhexene-1 | 2-Methylnonadecene-1 |
| 4,4-Dimethylhexene-1 | Eicosene-1 |
| 5,5-Dimethylhexene-1 | Cyclodecene |
| 2-Methyl-3-ethylpentene-1 | Cyclododecene |
| Cyclopentene | Cycloocta-1,5-diene |
| Cyclohexene | Butene-2 |
| Cycloheptene | Hexene-2 |
| Cyclooctene | Hexene-3 |
| Cyclononene | Octene-2 |
| Pentene-2 | Octene-4 |
| 4-Methyloctene-2 | Octene-3 |
| 4,6-Dimethyloctene-2 | Nonene-2 |
| 4-Methylheptene-2 | 5-Methyloctene-2 |
| 2-Ethylhexene-3 | 2-Methylhexene-3 |
| Heptene-2 | |

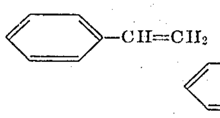

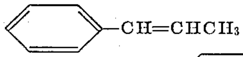

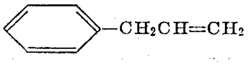

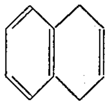
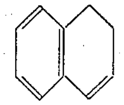
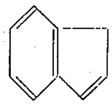

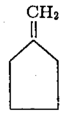
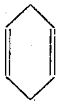

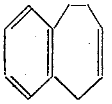
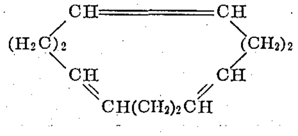

Acetylenic compounds include acetylene, methylacetylene, dimethylacetylene, phenylacetylene, penta-1-yne-4-ene, and the like. A preferred class of acetylenes includes 1-alkynes of the formula $$CH_3(CH_2)_nC ≡ CH, \text{ where } n \text{ is 0 to 20.}$$

Preferred alcohols are those selected from the group consisting of saturated aliphatic monohydric primary and secondary alcohols and most preferably contains up to 10 carbon atoms. Examples of such alcohols include:

| | | |
|---|---|---|
| Methanol | Pentanol-1 | β-Chloroethanol |
| Ethanol | Butanol-1 | β-Methoxyethanol |
| Propanol-1 | Hexanol-1 | Benzyl alcohol |
| Propanol-2 | Heptanol-1 | Neopentyl alcohol |

Particularly preferred are the primary alcohols.

Certain alcohols containing three or four primary hydroxyl groups are also preferred since carboalkoxylation products derived from these alcohols find particular utility as lubricants. These include 1,1,1-trimethylolalkanes such as 1,1,1-trimethylolethane, 1,1,1-trimethylolpropane, and 1,1,1-trimethylolbutane (three primary hydroxyl groups) and pentaerythritol (four primary hydroxyl groups).

Other alcohols that are suitable for this invention include:

| | |
|---|---|
| Isobutyl alcohol | 3,3-Dimethylbutan-1-ol |
| sec-Butyl alcohol | 6-Methyl-1-heptanol |
| Isoamyl alcohol | 6-Methyl-2-heptanol |
| 3,3-Dimethyl-1-pentanol | 4-Methyl-3-heptanol |
| 1-Octanol | 6-Methyl-4-heptanol |
| 4-Octanol | 5-Methyl-2-heptanol |
| 5-Methyl-1-hexanol | 5,5-Dimethyl-1-hexanol |
| 5-Methyl-3-hexanol | 5,5-Dimethyl-4-hexanol |
| 4-Methyl-2-hexanol | 1-Nonanol |
| 5-Methyl-4-heptanol | 2-Nonanol |
| 4-Methyl-1-heptanol | 4-Nonanol |
| 3-Methyl-1-heptanol | 8-methyl-1-octanol |
| 3-Methyl-2-heptanol | 2,3-Dimethyl-1-hexanol |
| 2,2-Dimethyl-1-hexanol | 4,5-Dimethyl-2-hexanol |
| 2,2-Dimethyl-3-hexanol | 3,5-Dimethyl-1-hexanol |
| 3,3-Dimethyl-2-hexanol | 3,5-Dimethyl-4-hexanol |
| 4,4-Dimethyl-1-pentanol | 6-Methyl-1-octanol |
| 2,2-Dimethyl-3-pentanol | 2-Methyl-1-octanol |
| 2-Methylpentan-1-ol | 3-Methyl-1-octanol |
| 2-Methylpentan-3-ol | 1,3-Propanediol |
| Lauryl alcohols and other dodecanols: | |
| Tridecanol | 1,4-Butanediol |
| Tetradecanol | 1,5-Pentanediol |
| Pentadecanol | 1,6-Hexanediol |
| Cetyl and other hexadecanols: | |
| Oleyl alcohol | Cyclopentyl alcohol |
| Heptadecanol | Cyclohexyl alcohol |
| Nonadecanol | Methylcyclohexyl alcohols |
| Arachic alcohol or 1-eicosanol | Decanols |
| α-Phenethyl alcohol | |
| β-Phenethyl alcohol | |
| 1-Methyl-2-phenylethanol | Dipentaerythritol |
| 4-Phenylbutanol | Neopentyl glycol |

Suitable methods for making palladium compounds containing bridging phosphido groups for use in the present invention are given by Hayter, Nature, 193, 872 (1962); Hayter, J. Am. Chem. Soc., 84, 3046 (1962); Hayter, Inorg. Chem., 3, 301 (1964). The palladium complexes can also be prepared by the reaction,

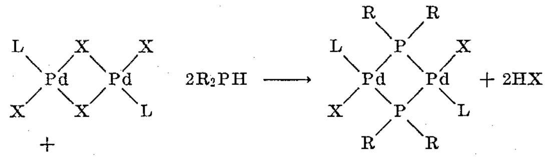

Examples of suitable ligands, L, ($R'_3P$) include:

| | |
|---|---|
| Triethylphosphine | Diphenyl-N-piperidinylphosphine |
| Tri-n-butylphosphine | Diphenyl-N-pyrrolidinylphosphine |
| Dimethylphenylphosphine | Diphenylbenzylphosphine |
| Diethylphenylphosphine | Methyl diphenylphosphinite |
| Methyldiphenylphosphine | Ethyl diphenylphosphinite |
| Ethyldiphenylphosphine | Phenyl diphenylphosphinite |
| Hexyldiphenylphosphine | Dimethyl phenylphosphonite |
| Triphenylphosphine | Diethyl phenylphosphonite |
| Tri-p-tolylphosphine | Methyl diphenylthiophosphinite |
| Tri-m-tolylphosphine | Ethyl diphenylthiophosphinite |
| Dimethylethylphosphine | Phenyl diphenylthiophosphite |
| Tricyclohexylphosphine | Tris(4-biphenylyl)phosphine |
| Dimethyl-p-methoxyphenylphosphine | |
| Diethyl-p-chlorophenylphosphine | |
| Tris(methylcyclopropyl)phosphine | |
| Diphenyl-p-bromophenylphosphine | |
| Diphenyl-2-naphthylphosphine | |
| Diisopropyl phenylphosphonite | |
| Diphenylvinylphosphine | |
| Diphenyl-N,N-dimethylaminophosphine | |
| Diphenyl phenylphosphonite | |

Examples of suitable ligands, L, ($R''_2PH$) include:

Diphenylphosphine
Diethylphosphine
Di-p-tolylphosphine
Di-m-tolylphosphine
Ethylphenylphosphine
Dibutylphosphine
Dihexylphosphine
Phenyl-p-chlorophenylphosphine
Di-p-methoxyphenylphosphine
Methylphenylphosphine
Dimethylphosphine The promoters optionally employed with the palladium catalysts of this invention are the halogen compounds of tin. These can be, $$R_p^{10}\ SnX_{4-p},\ SnXZ,\ \text{or}\ MSnZ_3,$$

wherein $R^{10}$ is an aromatic radical of up to 12 carbons consisting of one aryl radical, haloaryl radical, or alkaryl radical, X is chlorine or bromine, Z is fluorine, chlorine or bromine, M is a monovalent cation which can be an alkali metal cation or ammonium,

*p* is 0 to 3, inclusive,

Of the halotin compounds, stannous chloride is particularly preferred. Other preferred tin halide promoters include:

| | | |
|---|---|---|
| $SnF_2$ | $SnClF$ | $KSnCl_3$ |
| $NH_4SnCl_3$ | $SnBr_4$ | $(C_6H_5)_2SnCl_2$ |
| $(C_6H_5)_3SnCl$ | $SnCl_4$ | $SnBr_2$ |
| $KSnF_3$ | $C_6H_5SnCl_3$ | |

The promoters can be employed as the anhydrous compounds, or in the form of hydrates. It is to be understood that the formulae for, and discussion of, the promoters is meant to include such modifications as the hydrates even though the hydrates are not specifically noted. In general, the promoters are employed in a ratio of 0.5:10 moles of promoter per mole of the complex palladium compounds and preferably in about twice equimolar proportion of promoter to the palladium complex compounds.

The use of the palladium catalysts of this invention give high ratios of linear to branched carboalkoxylation products when the olefin reactant is a terminal olefin. The use of a tin halogen promoter gives an even higher ratio of linear product, in some cases greater than 9:1. The promoters also increase the conversion of olefins to esters over those obtained with the palladium catalyst without promoter.

The process of this invention can be readily carried out using well-known chemical engineering practice which includes continuous, semi-continuous and batch operation.

Reactors used in this invention must be able to withstand the temperatures and pressures involved. Pressure vessels of high tensile steel are generally used and they may be either lined or unlined. Suitable reactor liners include Hastelloy metals, stainless steel, silver, aluminum, copper, glass and glazed ceramics.

The reactions are carried out by charging the olefin, if liquid or solid, the alcohol, the palladium complex and, optionally, the tin halide into a suitable pressure-resistant vessel. It is sometimes useful to employ an inert solvent for the reaction such as acetone, tetrahydrofuran, dioxane or acetonitrile. The charged reactor is closed, chilled in Dry Ice, evacuated to remove air, and placed in a shaker or rocker. Olefin, if gaseous, is then added and the system connected to a supply of carbon monoxide added to give the desired pressure at the chosen reaction temperature.

The system is then heated under agitation until reaction is complete. As the reaction proceeds, more carbon monoxide is added periodically to maintain the pressure in the desired range. The course of the reaction is readily followed by observation of the drop in pressure. The product(s) can be removed from the reaction mixture by conventional methods of isolation such as distillation. Reaction times may proceed for as long as 24 hours although 5 to 10 hour periods usually suffice.

The esters made by the process of this invention are a well-known class of useful organic compounds. Many esters are useful as solvents, and as plasticizers for polymers. Some esters are useful in perfumes, essences, and flavoring agents. Diesters are additionally useful for making polymers, such as polyesters and polyamides. As noted above, polyesters can be made directly by the process of the present invention from unsaturated alcohols.

DESCRIPTION OF THE PREFERRED EMBODIMENTS

The following Examples are meant to illustrate but not to limit this invention.

EXAMPLE 1

An 80-cc Hastelloy C (Union Carbide Corporation) lined shaker tube was charged with 20 g (0.238 mole) of 1-hexene, 20 g (0.43 mole) of ethanol, 0.52 g (0.51 mmole) of $[((C_6H_5)_2PH)PdCl(P(C_6H_5)_2)]_2$ and 0.18 g The amounts of palladium catalyst and stannous chloride promoters used are shown in each example. The reaction mixtures were heated at the temperatures shown for 10 hours under 100 atmospheres of carbon monoxide pressure. The crude reaction mixtures were analyzed as in Example 1. The data are summarized in Table I.
(0.80 mmole) of stannous chloride dihydrate. The tube was cooled to −78°C, evacuated, and then heated at 90°C for 10 hours under 700 atmospheres of carbon monoxide pressure. The tube was cooled and the product consisted of a yellow liquid and some undissolved yellow solid. A glc analysis of the crude product showed that 97% of the 1-hexene was converted to a mixture of esters, 88.8% of which consisted of the linear ester, ethyl n-heptanoate. An additional 10.5% consisted of the α-methyl ester, ethyl 2-methylhexanoate. An additional 0.6% of a mixture of internal esters was also obtained.

EXAMPLES 2–20

These examples, designed to illustrate the varied operating temperatures, catalyst and promoter quantities that can be used in carboalkoxylation of olefins, follow. The reactor charges had the compositions:

20 g (0.238 mole) of 1-hexene
20 g (0.43 mole) of ethanol

TABLE I

| Example | $[((C_6H_5)_2PH)PdCl(P(C_6H_5)_2)]_2$ g (mmoles) | $SnCl_2.2H_2O$ g (mmoles) | Temp. °C | Conversion % | Linear Ester[1] % |
|---|---|---|---|---|---|
| 2 | 1.04 (1.02) | 0.36 (1.60) | 80 | 38 | 89.1 |
| 3 | 0.52 (0.51) | None | 90 | 36 | 77.4 |
| 4 | 0.52 (0.51) | 0.18 (0.80) | 90 | 57 | 90.6 |
| 5 | 0.52 (0.51) | 0.18 (0.80) | 110 | 91 | 90.9 |
| 6 | 0.52 (0.51) | 0.36 (1.60) | 90 | 68 | 89.6 |
| 7 | 1.04 (1.02) | 0.36 (1.60) | 90 | 89 | 85.4 |
| 8, 9 | 0.52 (0.51) | 0.18 (0.80) | 90 | 69, 72 | 92.4, 88.9 |
| 10 | 0.52 (0.51) | 0.18 (0.80) | 100 | 87 | 90.5 |
| 11 | 0.52 (0.51) | 0.18 (0.80) | 120 | 87 | 86.3 |
| 12 | 0.70 (0.68) | 0.24 (1.06) | 90 | 77 | 91.5 |
| 13[2] | 0.52 (0.51) | None | 90 | 2 | 55.8 |
| 14 | 0.52 (0.51) | None | 100 | 91 | 58.1 |
| 15[3] | 0.52 (0.51) | 0.18 | 110 | 53 | 89.3 |
| 16[4] | 0.52 (0.51) | 0.18 | 110 | — | 84.0 |
| 17[4] | 0.52 (0.51) | 0.18 | 90 | — | 84.9 |
| 18[3] | 0.52 (0.51) | 0.18 | 90 | 39 | 88.8 |
| 19 | 0.52 (0.51) | 0.23 (1.02) | 90 | 73 | 90.4 |
| 20 | 0.52 (0.51) | 0.23 (1.02) | 90 | 74 | 86.4 |

(1) Ethyl n-heptanoate
(2) 20 g of 5% HCl in ethanol replaced the normal ethanol charge.
(3) 27 g of 2-propanol replaced the ethanol. The principal product was 2-propyl n-heptanoate.
(4) 14 g of methanol replaced the ethanol. The principal product was methyl n-heptanoate.

Reported conversions are calculated by the formula:

% conversion = moles olefin consumed/moles olefin charged × 100

Similarly, the

"% linear product" =moles linear ester/moles total ester × 100

The amounts of total ester and linear ester were determined by gas-liquid partition chromatography (glc) at 125°C. on a ¼ inch × 9 feet column of butanediol succinate on diatomite support (Gas-Chrom R, Eagle-Picher).

EXAMPLE 21–26

The set of Examples in Table II is designed to illustrate the operability of specific tin halide promoters in the carboalkoxylation of olefins. The reactor charges had the compositions:

20 g of 1-hexene
20 g of ethanol
0.52 g (0.51 mmole) of $[((C_6H_5)_2PH)PdCl(P(C_6H_5)_2)]_2$ The tin compound charged is shown in each example. All reactions were carried out for 10 hours.

TABLE II

| Example | Tin Compound g (mmoles) | Temp. °C | CO Pressure Atm. | Conversion % | Linear Ester[1] % |
|---|---|---|---|---|---|
| 21 | KSnCl$_3$ 0.27 (1.0) | 90 | 700 | 65 | 84.3 |
| 22 | SnClF 0.18 (1.0) + 0.2 g H$_2$O | 90 | 100 | 11 | 86.7 |
| 23 | SnClF 0.18 (1.0) | 90 | 100 | 12 | 89.0 |
| 24 | SnClF 0.18 (1.0) + 0.2 g H$_2$O | 100 | 200 | 17 | 81.0 |
| 25, 26 | (C$_6$H$_5$)$_3$SnCl 0.31 (0.8) | 90 | 100 | 14, 16 | 82.2, 83.2 |

[1] Ethyl n-heptanoate.

EXAMPLES 27-32

The set of Examples in Table III is designed to illustrate the varied operating temperatures catalyst, and promoter quantities that can be used in carboalkoxylation of α,ω-diolefins. The reactor charges had the compositions:

17 g (0.12 mole) of 1,9-decadiene
20 g (0.43 mole) of ethanol

The amounts of palladium catalyst and stannous chloride promoters used are shown in each example. The reaction mixtures were heated at the temperatures shown for 10 hours under 100 atmospheres of carbon monoxide pressure. The crude reaction mixtures were analyzed by glc at 200°C on a ¼ inch× 4 feet column by butanediol succinate on diatomite support (Gas-Chrom R, Eagle-Picher).

TABLE III

| Example | [((C$_6$H$_5$)$_2$PH)PdCl(P(C$_6$H$_5$)$_2$)]$_2$ g (mmoles) | SnCl$_2$.2H$_2$O g (mmoles) | Temp. °C | Conversion 1,9-Decadiene % | Diester[1] % | Dilinear[2] Diester % |
|---|---|---|---|---|---|---|
| 27 | 0.52 (0.51) | 0.18 (0.80) | 90 | 74 | 31.1 | 75.7 |
| 28 | 0.52 (0.51) | 0.18 (0.80) | 110 | 92 | 59 | 77 |
| 29, 30 | 0.7 (0.68) | 0.24 (1.06) | 100 | 93, 93 | 58.6, 56.7 | 80.4, 80.5 |
| 31 | 1.04 (1.02) | 0.36 (1.60) | 110 | 97 | 79.9 | 72.6 |
| 32[3] | 0.52 (0.51) | 0.18 (0.80) | 90 | 88 | 42.2 | 79.2 |

[1] The percent of diester in the total ester product.
[2] The percent of the diester formed which is the dilinear diester, C$_2$H$_5$O$_2$C(CH$_2$)$_{10}$CO$_2$C$_2$H$_5$.
[3] The ethanol charged contained 1% water (0.2 g).

EXAMPLE 33

Using the procedure of Example 1, a mixture of 25 g of 4-vinyl-1-cyclohexene, 20 g of ethanol, 0.52 g of [((C$_6$H$_5$)$_2$PH)PdCl(P(C$_6$H$_5$)$_2$)], and 0.18 g of SnCl$_2$.2H$_2$O was heated at 100°C for 10 hours under 100 atmospheres of carbon monoxide pressure. A glc analysis of the reaction mixture showed the formation of monoesters which contained 83% of the linear isomer

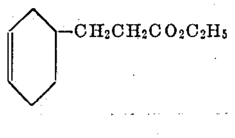

EXAMPLE 34

Using the procedure of Example 1, a mixture of 2 g of cyclooctene, 2 ml of ethanol, and 0.1 g of [((C$_6$H$_5$)$_2$PH)PdCl(P(C$_6$H$_5$)$_2$)]$_2$ was heated at 90°C for 10 hours under 100 atmospheres of carbon monoxide pressure. Volatiles were removed from the reaction mixture under vacuum, and the residue was distilled in a micro distillation apparatus at 0.1 mm to give 0.90 g of ethyl cyclooctanecarboxylate.

| Anal. Calcd. for C$_{11}$H$_{20}$O$_2$: | C, 71.70; | H, 10.94 |
|---|---|---|
| Found: | C, 71.75; | H, 11.09 |

EXAMPLE 35

Using the procedure of Example 1, a mixture of 3 g of 1-pentene, 1 g of 1,1,1-trimethylolethane, 0.1 g of [((C$_6$H$_5$)$_2$PH)PdCl(P(C$_6$H$_5$)$_2$)]$_2$ catalyst, and 0.05 g of SnCl$_2$.2H$_2$O was heated at 100°C for 10 hours under 100 atmospheres of carbon monoxide pressure. Volatiles were removed from the resulting mixture at reduced pressure. An infrared spectrum of the residue showed a strong ester $\nu_{C=O}$ band at ca. 1,725 cm$^{-1}$ indicating that carboalkoxylation had occurred.

EXAMPLE 36

Using the procedure of Example 1, a mixture of 2 g of trans-2-hexene, 2 ml of ethanol, and 0.1 g of [((C$_6$H$_5$)$_2$PH)PdCl(P(C$_6$H$_5$)$_2$)]$_2$ catalyst as heated at 90°C for 10 hours under 100 atmospheres of carbon monoxide pressure. A glc analysis of the resulting mixture showed a 7% conversion of 2-hexene to give a mixture of ethyl esters of branched C$_7$ acids. Volatiles were removed from the mixture under vacuum, and an infrared spectrum of the residue showed a strong ester $\nu_{C=O}$ band at ca. 1,710 cm$^{-1}$ confirming that carboalkoxylation had occurred.

EXAMPLE 37

Using the procedure of Example 1, a mixture of 2 g of 1-hexyne, 2 ml of ethanol, and 0.1 g of [((C$_6$H$_5$)$_2$PH)PdCl(P(C$_6$H$_5$)$_2$)]$_2$ catalyst was heated at 100°C for 10 hours under 100 atmospheres of carbon monoxide pressure. A glc analysis of the reaction mixture showed the formation of a mixture of ethyl esters of $C_7$ acids which contained 84% of the branched isomer $$CH_3(CH_2)_3\underset{\underset{CH_2}{\|}}{C}CO_2C_2H_5$$

and 16% of the linear isomer $CH_3(CH_2)_3CH{=}CHCO_2C_2H_5$.

EXAMPLE 38

$$CH_3CH_2C(CH_2OH)_3 + 3\ \text{1-octene} + 3\ CO \longrightarrow CH_3CH_2C\left[CH_2O\overset{\overset{O}{\|}}{C}(CH_2)_7CH_3\right]_3$$

Using the procedure of Example 1, a mixture of 4 g of 1-octene, 1 g of 1,1,1-trimethylolpropane, and 0.2 g of $[((C_6H_5)_2PH)PdCl(P(C_6H_5)_2)]_2$ catalyst was heated at 100°C for 24 hours under 100 atmospheres of carbon monoxide pressure. Volatiles were removed from the resulting mixture at reduced pressure. An infrared spectrum of the residue showed a strong ester $\nu_{C=O}$ band at ca. 1740 $cm^{-1}$ and no $\nu_{O-H}$ band indicating that carboalkoxylation had occurred. This residue was distilled in a small molecular distillation apparatus at 0.1 mm to give 2.9 g of clear liquid product. Anal. Calcd. for $C_{33}H_{62}O_6$: C, 71.44; H, 11.26

Found: C, 71.65; H, 11.17.

EXAMPLE 39

(For Comparative Purposes)

Using the procedure of Example 1, a mixture of 20 g of 1-hexene, 10 g of water, 10 g of acetone, 0.52 g of $[((C_6H_5)_2PH)PdCl(P(C_6H_5)_2)]_2$ catalyst and 0.23 g of $SnCl_2.2H_2O$ was heated at 90°C for 10 hours at 100 atmospheres of carbon monoxide pressure. Evaporation of the mixture at reduced pressure gave no liquid residue indicating that no acid had been formed in the reaction.

Table IV

When the procedures of this invention are applied to the unsaturated compounds of column 1 and the alcohols of column 2, the products shown in columns 3 and 4 are obtained.

TABLE IV

| Unsaturated compounds | Alcohols | Products | |
|---|---|---|---|
| $CH_2{=}CH_2$<br>$CH_3CH{=}CH_2$<br>$(CH_3)_2CH{=}CH_2$<br>$CH_3(CH_2)_5CH{=}CH_2$ | $CH_3CHOHCH_2CH_3$<br>$CH_3(CH_2)_3CH_2OH$<br>$CH_3(CH_2)_3OH$<br>$(CH_3)_3CCH_2CH_2OH$ | $CH_3CH_2COOCH(CH_3)(C_2H_5)$<br>$CH_3CH_2CH_2COO(CH_2)_4CH_3$<br>$(CH_3)_2CHCH_2COO(CH_2)_5CH_3$<br>$CH_3(CH_2)_7COOCH_2CH_2C(CH_3)_3$ | <br>$(CH_3)_2CHCOO(CH_2)_4CH_3$<br>$(CH_3)_3CCOO(CH_2)_3CH_3$<br>$CH_3(CH_2)_5CHCOOCH_2CH_2C(CH_3)_3$<br>$\vert$ $CH_3$ |
| $CH_3CH_2C{=}CH_2$<br>$\vert$ $CH_3$ | $(CH_3)_2CH(CH_2)_3OH$ | $CH_3CH_2CCH_2COO(CH_2)_3CH(CH_3)_2$<br>$\vert$ $CH_3$ | $CH_3CH_2C(CH_3)_2COO(CH_2)_3CH(CH_3)_2$ |
| $CH_3(CH_2)_7CH{=}CH_2$ | $CH_3(CH_2)_7OH$ | $CH_3(CH_2)_9COO(CH_2)_7CH_3$ | $CH_3(CH_2)_7CHCOO(CH_2)_7CH_3$<br>$\vert$ $CH_3$ |
| $CH_3CH{=}CHCH_3$ | $(CH_3)_3C(CH_2)_3OH$ | $CH_3CHCOO(CH_2)_3C(CH_3)_3$<br>$\vert$ $CH_2CH_3$ | |
| $CH_3CH_2CH{=}CHCH_3$ | $CH_3(CH_2)_2OH$ | $CH_3(CH_2)_2CHCOO(CH_2)_2CH_3$<br>$\vert$ $CH_3$ | $CH_3CH_2CHCOO(CH_2)_2CH_3$<br>$\vert$ $CH_2CH_3$ |
| $CH_3O(CH_2)_3CH{=}CH_2$ | $NCC_6H_4CH_2OH$ | $CH_3O(CH_2)_5COOCH_2C_6H_4CN$ | $CH_3O(CH_2)_3CHCOOCH_2C_6H_4CN$<br>$\vert$ $CH_3$ |
| NC— 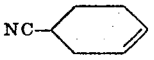 | $CH_3(CH_2)_2CHOH(CH_2)_2CH_3$ | NC— 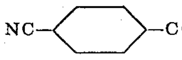 —$COOCH[(CH_2)_2CH_3]_2$ | NC— 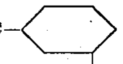<br>$COOCH[(CH_2)_2CH_3]_2$ |
| $CH_2{=}CHCH_2C_6H_5$ | $CH_3(CH_2)_{15}OH$ | $C_6H_5(CH_2)_3COO(CH_2)_{15}CH_3$ | $C_6H_5CH_2CHCOO(CH_2)_{15}CH_3$<br>$\vert$ $CH_3$ |
| $CH_3COOCH_2CH{=}CH_2$ | $(CH_3)_2CHCH_2OH$ | $CH_3COO(CH_2)_3COOCH_2CH(CH_3)_2$ | $CH_3COOCH_2CHCOOCH_2CH(CH_3)_2$<br>$\vert$ $CH_3$ |
| $C_2H_5OCOCH_2CH{=}CHCH_3$ | $C_4H_9OH$ | $C_2H_5OCO(CH_2)_2CHCOOC_4H_9$<br>$\vert$ $CH_3$ | $C_2H_5OCOCH_2CHCOOC_4H_9$<br>$\vert$ $CH_2CH_3$ |
| $CH_3COCH_2CH{=}CH_2$ | $CH_3CH_2C(CH_3)_2CH_2OH$ | $CH_3CO(CH_2)_3COOCH_2C(CH_3)_2CH_2CH_3$ | $CH_3COCH_2CHCOOCH_2C(CH_3)_2CH_2CH_3$<br>$\vert$ $CH_3$ |
| $NH_2CO(CH_2)_8CH{=}CH_2$ | $(CH_3)_3C(CH_2)_2OH$ | $H_2NCO(CH_2)_{10}COO(CH_2)_2C(CH_3)_3$ | $H_2NCO(CH_2)_8CHCOO(CH_2)_2C(CH_3)_3$<br>$\vert$ $CH_3$ |
| $CH_3C{\equiv}CH$ | $CH_3(CH_2)_7(CHCl)_2(CH_2)_8OH$ | $CH_3CH{=}CHCOO(CH_2)_8(CHCl)_2(CH_2)_7CH_3$ | $CH_3CCOO(CH_2)_8(CHCl)_2(CH_2)_7CH_3$<br>$\Vert$ $CH_2$ |
| $C_6H_5COCH_2CH{=}CH_2$ | $C_{10}H_{21}OH$ | $C_6H_5CO(CH_2)_3COOC_{10}H_{21}$ | $C_6H_5COCH_2CHCOOC_{10}H_{21}$<br>$\vert$ $CH_3$ |
| $ClC_6H_4CH_2CH{=}CH_2$ | $(CH_3)_2CHOH$ | $ClC_6H_4(CH_2)_3COOCH(CH_3)_2$ | $ClC_6H_4CH_2CHCOOCH(CH_3)_2$<br>$\vert$ $CH_3$ |

TABLE IV – Continued
| Unsaturated compounds | Alcohols | Products | |
|---|---|---|---|
| $CH_3CH_2C\equiv CCH_2CH_3$ | $C_6H_5(CH_2)_3OH$ | 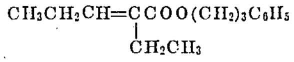 | |
| $C_6H_5C\equiv CH$ | $C_4H_9OH$ | 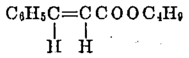 | 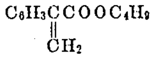 |
| 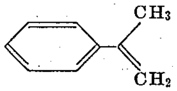 | $CH(CH_3)_2(CH_2)_3OH$ | 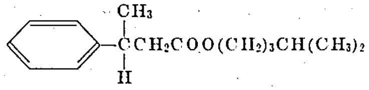 | 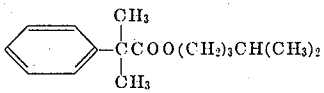 |
| 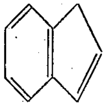 | $C_3H_7OH$ | 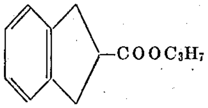 | 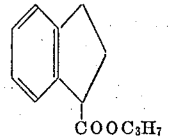 |
| 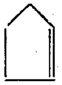 | $C_2H_5OH$ | 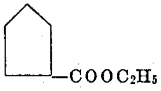 | |
| 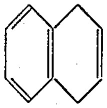 | $CH_3OH$ | 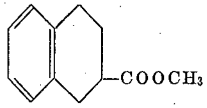 | |
| 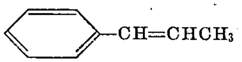 | 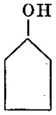 | 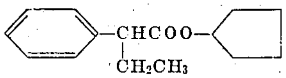 | 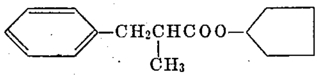 |
| 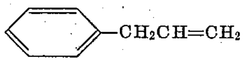 | 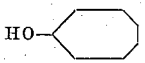 | 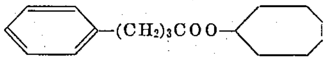 | 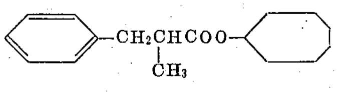 |
| 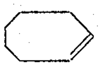 | $C_6H_{13}OH$ | 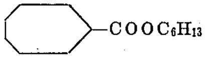 | |
| 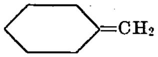 | $C_2H_5OH$ | 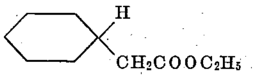 | 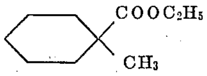 |
| 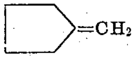 | $CH_3OH$ | 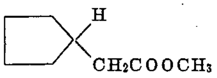 | 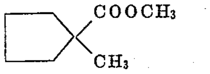 |

TABLE IV—Continued

| Unsaturated compounds | Alcohols | Products | |
|---|---|---|---|
|  | $CH_3CHOH(CH_2)_4CH_3$ | 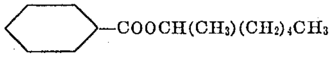 | |
|  | 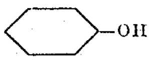 | 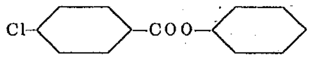 | 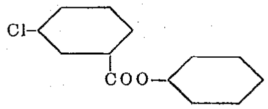 |
| $CH_3OC_6H_4CH{=}CH_2$ | $C_2H_5CNOHC_2H_5$ | $CH_3OC_6H_4CH_2CH_2COOCH(C_2H_5)_2$ | $CH_3OC_6H_4CHCOOCH(C_2H_5)_2$<br>$CH_3$ |
| 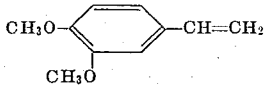 |  | 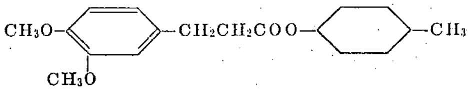 | 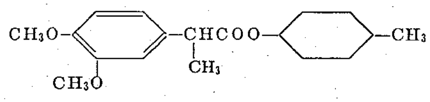 |
| $(CH_3)_2NCO(CH_2)_8CH{=}CH_2$ | $C_2H_5OH$ | $(CH_3)_2NCO(CH_2)_{10}COOC_2H_5$ | $(CH_3)_2NCO(CH_2)_8CHCOOC_2H_5$<br>$CH_3$ |
| 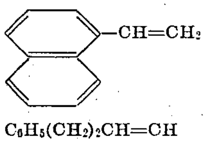 | $C_3H_7OH$ | 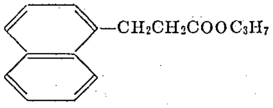 | 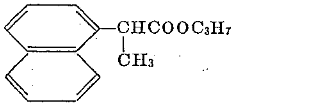 |
| $C_6H_5(CH_2)_2CH{=}CH$ | $C_5H_{11}OH$ | $C_6H_5(CH_2)_4COOC_5H_{11}$ | $C_6H_5(CH_2)_2CHCOOC_5H_{11}$<br>$CH_3$ |
| $CH_3(CH_2)_{12}CH{=}CH$ | $CH_3(CH_2)_3CHOHCH_3$ | $CH_3(CH_2)_{11}COOCH(CH_3)(CH_3)_3CH_3$ | $CH_3(CH_2)_{12}CHCOOCH(CH_3)(CH_2)_3CH_3$<br>$CH_3$ |
| $C_6H_5CH_2CH{=}CHCH_2C_6H_5$ | $[CH_3(CH_2)_2]_2CHOH$ | $C_6H_5CH_2CHCOOCH[(CH_2)_2CH_3]_2$<br>$CH_2CH_2C_6H_5$ | |
|  | $HO(CH_2)_2O(CH_2)_2OH$ | 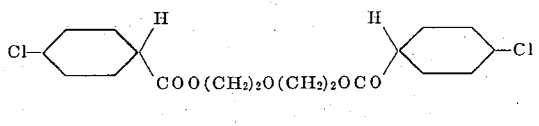 | 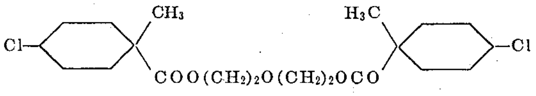<br>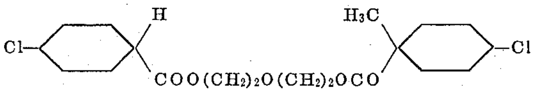 |
| 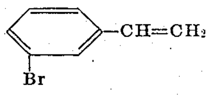 | $C_3H_7OH$ | 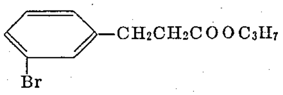 | 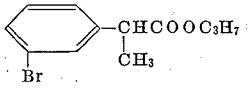 |
| 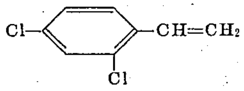 | $C_2H_5OH$ | 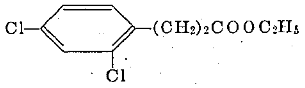 | 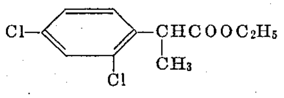 |

TABLE IV – Continued

| Unsaturated compounds | Alcohols | Products | |
|---|---|---|---|
| 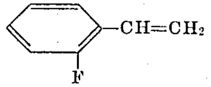 | $CH_3OH$ | 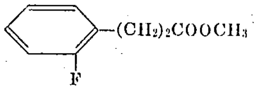 | 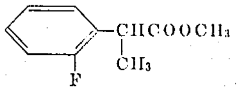 |
| 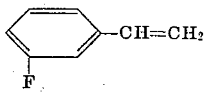 | $CH_3OH$ | 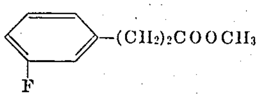 | 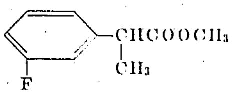 |
| 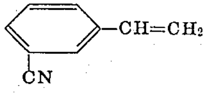 | $CH_3OH$ | 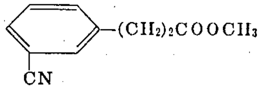 | 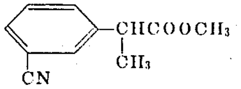 |
| $CH_2{=}CH(CH_2)_2CH{=}CH_2$ | $C_2H_5OH$ | $C_2H_5OCO(CH_2)_6COOC_2H_5$<br>$CH_2{=}CH(CH_2)_2CH(CH_3)CO_2C_2H_5$<br>$CH_2{=}CH(CH_2)_4CO_2C_2H_5$ | $C_2H_5OCO(CH_2)_4CHCOOC_2H_5$<br>$CH_3$<br>$C_2H_5OCOCH(CH_2)_2CHCOOC_2H_5$<br>$CH_3$ $CH_3$ |
| $CH_3C_6H_4CH{=}CH_2$ | $(CH_3)_2CHOH$ | $CH_3C_6H_4(CH_2)_2COOCH(CH_3)_2$ | $CH_3C_6H_4CHCOOCH(CH_3)_2$<br>$CH_3$ |
| $CH_3(CH_2)_3CH{=}CH_2$ | $C(CH_2OH)_4$ | $C[CH_2OOC(CH_2)_5CH_3]_4$<br>$C[CH_2OOC(CH_2)_5CH_3]_2$<br>$[CH_2OOCCH(CH_2)_3CH_3]_2$<br>$CH_3$ | $C[CH_2OOC(CH_2)_5CH_3]_3$<br>$CH_2OOCCH(CH_2)_3CH_3$<br>$CH_3$<br>$CH_3$<br>$C[CH_2OOCCH(CH_2)_3CH_3]_3$<br>$CH_2OOC(CH_2)_5CH_3$ |
| 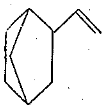 | $CH_3CH_2OH$ | 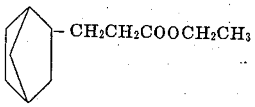 | 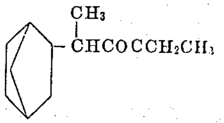 |

I claim:

1. A process for making carboxylic ester compounds comprising reacting an aliphatically unsaturated compound,
carbon monoxide, and
an alcohol in the presence of a catalytic amount of the catalyst

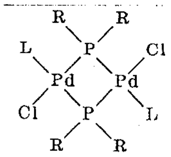

wherein:

R is lower alkyl or phenyl;

L is a trivalent organophosphorus ligand, $R'_3P$ or $R''_2PH$;

the R''s, alike or different, are lower alkyl, phenyl or phenyl substituted by one lower alkyl group; and the R'''s alike or different, are phenyl or phenyl substituted by one lower alkyl group;

the unsaturated compound having up to 30 carbon atoms and being of the formula

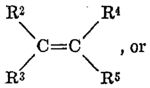 , or $R^6—C\equiv C—R^7$, wherein at least two of $R^2$, $R^3$, $R^4$ and $R^5$ are hydrogen, $R^2$ to $R^7$ are hydrogen or aliphatically saturated substituted or unsubstituted hydrocarbyl radicals, and any two of $R^2$, $R^3$, $R^4$ and $R^5$ can be joined to form a ring of 3 to 12 carbon atoms, and when more than one unsaturated group is present in the molecule, at least one of $R^2$ to $R^7$ will be a common linking radical, said unsaturated compound optionally having up to three substituents selected from aryl, lower alkoxy, lower alkoxycarbonyl, carboxyl, lower acyloxy, cyano, carbamoyl, lower acyl, aroyl, halo and hydroxy, with the proviso that halogen or hydroxyl, if present, be removed by at least 2 carbon atoms from the unsaturation; and the alcohol having the formula $$R^9(OH)_m$$

wherein $R^9$ is a radical of up to 30 carbon atoms derived from a hydrocarbon having at least one aliphatic or alicyclic group and the hydroxy groups are joined to a saturated carbon atom having at least one hydrogen substitutent, and removed from aliphatic unsaturation by at least 2 carbon atoms, and $m$ is 1 to 6.

2. A process according to claim 1 wherein the unsaturated compound has olefinic unsaturation and is selected from the group consisting of 1-alkenes of the formula $CH_3(CH_2)_nCH=CH_2$, where $n$ is 0 to 20, diolefins of the formula $CH_2=CH(CH_2)_nCH=CH_2$, where $n$ is 1 to 8, and esters of the formula, lower alkyl—O—CO—$(CH_2)_nCH_2$, where $n$ is less than 25.

3. A process according to claim 2, wherein the alcohol is selected from the group of saturated aliphatic monohydric primary and secondary alcohols of up to 10 carbon atoms.

4. A process according to claim 2 wherein the alcohol is selected from the group consisting of those alcohols having three or four primary hydroxyl groups.

5. A process according to claim 1 wherein the unsaturated compound is selected from the group consisting of 1-alkynes of the formula $CH_3(CH_2)_nC \equiv CH$ where $n$ is 0 to 20.

6. A process according to claim 5 wherein the alcohol is selected from the group of saturated aliphatic monohydric primary and secondary alcohols of up to 10 carbon atoms.

7. A process according to claim 5 wherein the alcohol is selected from the group consisting of those alcohols having three or four primary hydroxyl groups.

8. A process according to claim 1 wherein the catalyst is $$[((C_6H_5)_2PH)PdCl(P(C_6H_5)_2)]_2.$$

9. A process according to claim 8 wherein the unsaturated compound has olefinic unsaturation and is selected from the group consisting of 1-alkenes of the formula $CH_3(CH_2)_nCH=CH_2$, where $n$ is 0 to 20, diolefins of the formula $CH_2=CH(CH_2)_nCH=CH_2$, where $n$ is 1 to 8, and esters of the formula lower alkyl—O—CO—$(CH_2)_nCH=CH_2$, where $n$ is less than 25.

10. A process according to claim 9 wherein the alcohol is selected from the group saturated aliphatic monohydric primary and secondary alcohols of up to 10 carbon atoms, and alcohols having three or four primary hydroxyl groups.

11. A process according to claim 8 wherein the unsaturated compound is selected from the group consisting of 1-alkynes of the formula $CH_3(CH_2)_nC\equiv CH$ where $n$ is 0 to 20.

12. A process according to claim 11 wherein the alcohol is selected from the group saturated aliphatic monohydric primary and secondary alcohols of up to 10 carbon atoms, and alcohols having three or four primary hydroxyl groups.

13. A process according to claim 1 wherein the unsaturated compound is an alcohol.

14. A process according to claim 13 wherein the compound is $$HO—CH_2—R^8—CH=CH_2$$

wherein $R^8$ is an aliphatically saturated biradical.

15. A process according to claim 14 wherein the biradical is a polymethylene chain of 2 to 15 carbon atoms.

16. A process according to claim 1 employing a promoter at a molar ratio of between 0.5:1 to 10:1, promoter to catalyst, said promoter having the formula $(C_6H_5)_3SnX$, $SnXZ$, or $MSnZ_3$, wherein X is chlorine or bromine, Z is fluorine, chlorine or bromine, and M is alkali metal or ammonium.

17. A process according to claim 16 wherein the promoter is stannous chloride.

18. A process according to claim 16 wherein the unsaturated compound is an alcohol.

19. A process according to claim 2 employing a promoter at a molar ratio of between 0.5:1 to 10:1, promoter to catalyst, said promoter having the formula
$(C_6H_5)_3SnX$, $SnXZ$, or $MSnZ_3$, wherein
X is chlorine or bromine,
Z is fluorine, chlorine or bromine, and
M is alkali metal or ammonium.

20. A process according to claim 19 wherein the catalyst is $$[((C_6H_5)_2PH)PdCl(P(C_6H_5)_2)]_2.$$

* * * * *

PO-1050
(5/69)

UNITED STATES PATENT OFFICE
CERTIFICATE OF CORRECTION

Patent No. 3,859,319 Dated January 7, 1975

Inventor(s) Joseph J. Mrowca

It is certified that error appears in the above-identified patent and that said Letters Patent are hereby corrected as shown below:

Column 1, line 28 - correct the patent number to read "3,622,607".

Column 2, line 12 - change "$R^1{}_2PH$" to "$R''_2PH$".

Column 2, line 63 - change "200 + C" to "200°C".

Column 5, line 45 - add a "+" sign between the formulae for the reactants.

Column 5, line 58, Second column - change "phenyl diphenylthiophosphite" to "phenyl diphenylthiophosphinite".

Column 8, lines 6-12 - These lines should be relocated in the column to follow line 31 just in front of Table I.

Column 9, line 18 - insert a comma after "temperatures".

Column 9, line 50 - insert a subscript 2 after $[((C_6H_5)_2PH)PdCl(P(C_6H_5)_2)]$".

Column 10, line 52 - "as" should be "was".

Table IV (Columns 13 and 14), column 3, first entry - correct the formula to read $CH_3CH_2COOCH(CH_3)(C_2H_5)$.

PO-1050
(5/69)

UNITED STATES PATENT OFFICE
CERTIFICATE OF CORRECTION

Patent No. 3,859,319 Dated January 7, 1975

Inventor(s) Joseph J. Mrowca

It is certified that error appears in the above-identified patent and that said Letters Patent are hereby corrected as shown below:

Table IV (Columns 13 and 14), column 2, third entry - change "$CH_3(CH_2)_3OH$" to "$CH_3(CH_2)_5OH$".

Table IV (Columns 13 and 14), column 4, second entry - change "$(CH_3)_3CCOO(CH_2)_3CH_3$" to "$(CH_3)_3CCOO(CH_2)_5CH_3$".

Table IV (Columns 17 and 18), column 2, second entry - the entry should read "$C_2H_5CHOHC_2H_5$".

Table IV (Columns 19 and 20), column 4, last entry - The entry should read " 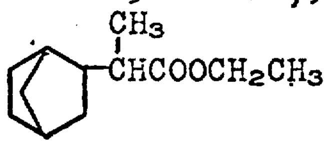 "

Column 21, Claim 2, last line - formula should read "kyl-O-CO-$(CH_2)_n$CH=$CH_2$".

Table IV (Columns 13 and 14), column 1, third entry - change "$(CH_3)_2CH=CH_2$" to "$(CH_3)_2C=CH_2$".

Table IV (Columns 13 and 14), column 4, second entry from bottom - the entry should read "$C_6H_5COCH_2CHCOOC_{10}H_{21}$"
$CH_3$

PO-1050
(5/69)

UNITED STATES PATENT OFFICE
CERTIFICATE OF CORRECTION

Patent No. 3,859,319 Dated January 7, 1975

Inventor(s) Joseph J. Mrowca

It is certified that error appears in the above-identified patent and that said Letters Patent are hereby corrected as shown below:

Table IV (Columns 15 and 16), column 4, first entry - the entry should read "$C_6H_5CCOOC_4H_9$".
$\quad\quad\quad\quad\quad\quad\quad\quad\| $
$\quad\quad\quad\quad\quad\quad\quad CH_2$ Table IV (Columns 17 and 18), column 3, third entry from bottom - the entry should read

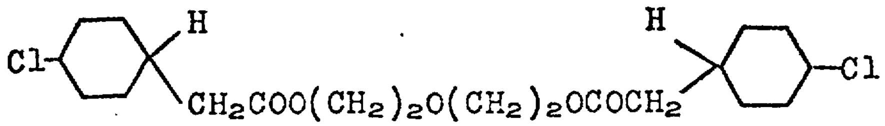

Table IV (Columns 17 and 18), column 4, third entry from the bottom - the entry should read "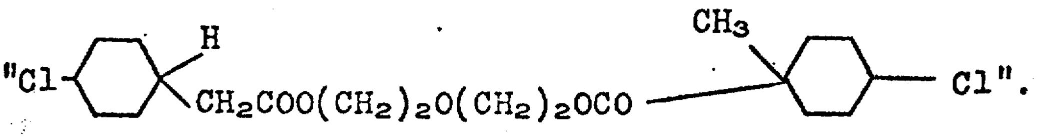".

Signed and sealed this 13th day of May 1975.

SEAL)
ttest:

UTH C. MASON
ttesting Officer

C. MARSHALL DANN
Commissioner of Patents
and Trademarks